Jan. 20, 1942.                E. G. BUSSE                2,270,262
                           RAILWAY BRAKE BEAM
                           Filed May 31, 1940

INVENTOR.
EDWIN G. BUSSE
BY Rodney Bedell
ATTORNEY.

Patented Jan. 20, 1942

2,270,262

UNITED STATES PATENT OFFICE 2,270,262

RAILWAY BRAKE BEAM

Edwin G. Busse, Chicago, Ill., assignor to Chicago Railway Equipment Company, Chicago, Ill., a corporation of Illinois Application May 31, 1940, Serial No. 338,055

12 Claims. (Cl. 188—226)

The invention relates to railway brake beams of the truss type which includes a compression member and a tension member with a strut between them intermediate their ends and with their ends converging towards each other and provided with tensioning means holding the ends in assembled relation, there being brake heads and shoes carried on the ends of the beam and through which braking forces are applied to the truck wheels.

The general object of the invention is to prevent or limit flexing of the tension rod about the bearing of the same in the brake head or about the bearing of the tension rod nut, or other tensioning means, on the brake head. Such flexing is likely to occur when the brakes are applied, particularly if there is not a close, accurate fit between the brake head and associated parts.

In an earlier application filed by the present inventor May 10, 1939, Serial No. 272,927, there is described a brake beam structure in which the brake head includes a sleeve surrounding the tensioning rod at points spaced from the tensioning device and having the same general object as the present invention.

The railroads are using many break beams of the type under consideration having tension rods of different diameters, and the brake heads in use or in stock are apertured to receive the different diameter rods. Obviously brake heads provided with sleeves for closely engaging the rod to prevent its bending, as is described in the above-mentioned application, would be effective only for a given diameter of rod.

It is a further object of the present invention to adapt a brake head of the class described for use with different diameters of rods without sacrificing the desirable quality of holding the rod against bending relative to the head.

A more specific object of the present invention is to provide a liner or filler between a tension rod and a brake head sleeve whereby any variation contemplated or accidental in the diameter of the rod and the inside diameter of the sleeve may be compensated for.

An incidental object is to assure the assembly of a liner or filler of the type referred to with a brake head during shipping and handling prior to complete assembly with the rest of the beam parts.

These and other detailed objects of the invention are attained in the structures illustrated in the accompanying drawing in which—

Figure 1:
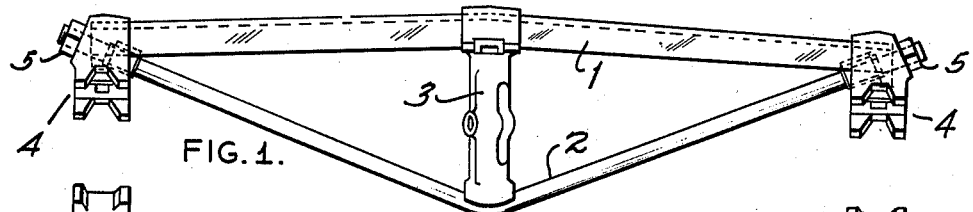
Figure 1 is a top view of a truss type brake beam of the general type referred to and embodying one form of the invention.
Figure 2:
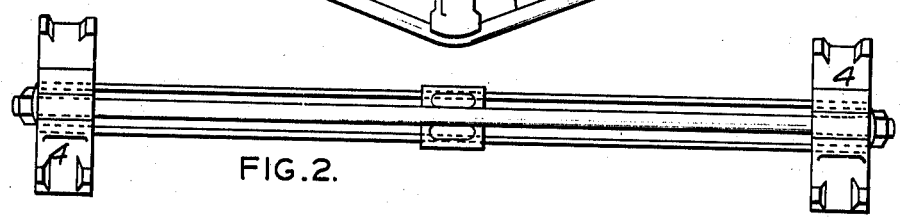
Figure 2 is a front elevation of the beam with one end sectioned vertically to illustrate more clearly the mounting of the head on the compression member and the securing of the end of the tension member to the head.
Figure 3:
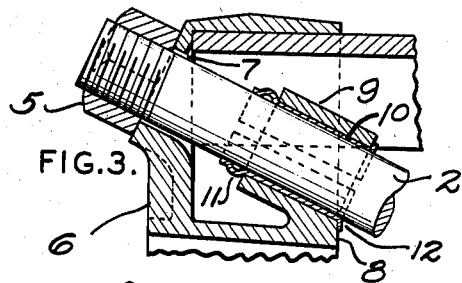
Figure 3 is a detail horizontal section taken on the line 3—3 of Figure 1 but drawn to an enlarged scale.

The brake beam illustrated in Figures 1, 2 and 3 includes a compression member 1, a tension member 2, a strut 3, break heads 4 with pockets receiving the ends of compression member 1, on which the heads are seated and nuts 5 threaded onto the ends of tension member 2 and seated against the outer faces of brake heads 4 and serving as tensioning devices whereby the initial setting of the brake beam may be provided. The face of each head is arranged to mount the ordinary brake shoe (not shown) which contacts the wheel when the brakes are applied.

These parts, so far as described above and as indicated generally in the drawing, correspond to the usual truss type brake beam arrangement.

The outer wall 6 of the brake head has a substantial aperture 7 which freely receives the end portion of the tension rod irrespective of the diameter of the latter within range of rods generally used in such beams. The inner wall 8 of the head has a corresponding aperture freely receiving the tension rod and preferably this head wall is enlarged or extended transversely of the head to form an integral sleeve-like part 9 arranged to surround the tension rod for a substantial distance at a point spaced from tensioning nut 5. Sleeve 9 has an inside diameter great enough to receive the largest diameter rod with which the head may be used, and a separately formed liner or filler 10 is inserted in sleeve 9 to provide a close fit around rod 2. It will be understood that this liner may be removed and a thicker or thinner liner may be substituted therefor as may be required to secure the desired fit.

Preferably the liner is of resilient material and is deformable by being split longitudinally at one side. It may be provided with offset portions 11 and 12 whereby when the liner is inserted lengthwise into sleeve 8, it will be distorted and held by friction and by elements 11 and 12 against accidental removal from the sleeve.

Figure 4:
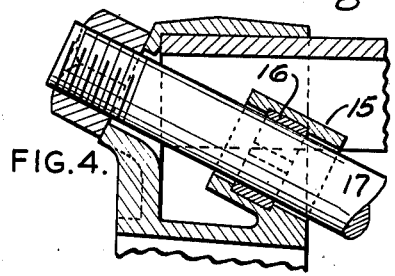

Figure 4 illustrates another form of the invention in which the brake head sleeve 15 corresponds to sleeve 9 previously described except that it has a recess in its inner periphery which receives a relatively short spring liner or bushing 16 for closely surrounding the tension rod 17. This arrangement makes possible the use of a substantially thicker liner, irrespective of the relative diameters of the rod and sleeve, than might be useable with the arrangement shown in Figure 3.

Figure 5:
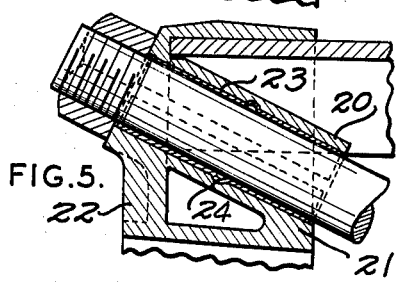

Figure 5 illustrates another form of the invention in which the brake head sleeve 20 extends continuously between the brake head inner and outer walls 21 and 22. The liner 23 corresponds to the liners previously shown but extends substantially through the full width of the brake head and is provided with an offset portion 24 intermediate its ends received in a corresponding recess in the inner periphery of the sleeve for retaining the liner assembly with the sleeve during shipment and handling.

Figure 6:
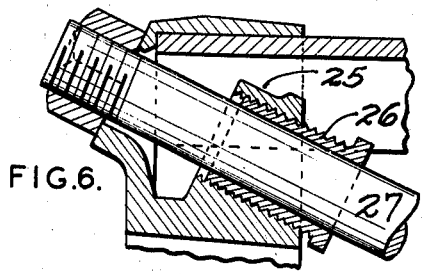

Figure 6 illustrates another form of the invention in which the brake head sleeve 25 corresponds generally to that shown in Figures 3 and 4 but is threaded internally to receive an externally threaded liner or bushing 26 having an internal diameter corresponding to the external diameter of the tension rod 27.

Figure 7:
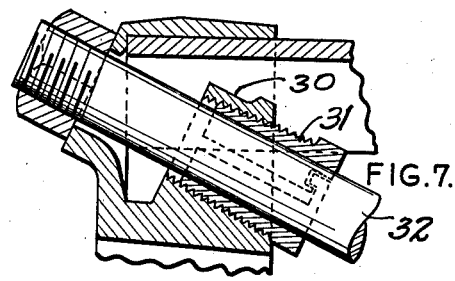
Figures 4–9 are sections similar to Figure 3 but each illustrates a different form of the invention.

Figure 7 illustrates another form of the invention in which the brake head sleeve 30 is the same as sleeve 25 just described but the liner 31 is split and has its threaded exterior tapered lengthwise so that as it is threaded into the sleeve it more firmly grips the tension rod 32. The sleeve may be split at one side or may be split at both sides, making the sleeve in two pieces.

Figure 8:
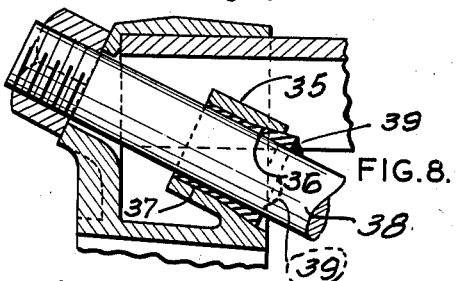

Figure 8 illustrates another form of the invention in which the brake head sleeve 35 corresponds to the sleeve in Figure 3 except that the opening therethrough is flared near the outer end of the sleeve as indicated at 36. A liner 37 is formed of material, such as vulcanized rubber, lead, or other relatively soft metal, of such characteristics that while it may yield when tension rod 38 is inserted therethrough, it will offer sufficient resistance to lateral movement of the rod in the sleeve to avoid undesirable bending strains being set up in the rod when the brakes are applied. One or more shoulders 39 welded or otherwise secured to rod 38 hold the yielding material against further distortion and reduction of grip on the rod.

Figure 9:
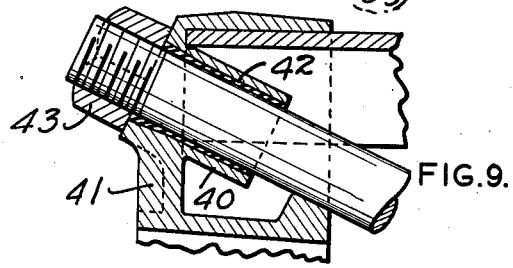

Figure 9 illustrates another form of the invention in which the brake head sleeve portion 40 extends inwardly from the head outer wall 41 and its inner periphery is flared longitudinally near its outer end. A filler 42 of yielding material, as used in Figure 8, is applied to the sleeve and is held in the sleeve by the rod nut 43.

Each form of the invention provides a filler between the rod and the sleeve which may be readily selected and applied originally or substituted for an original filler of a different thickness or, indeed, inserted into a brake head sleeve which had no filler in its original assembly.

Each form of the invention will effectively resist relative movement of the head and rod transversely or angularly relative to the thrust set up by the tightening of the tensioning nut or the application of the brakes. Any inaccuracy in the alignment or finish of the parts will be compensated for by the liner, particularly where the latter is of yielding material as indicated in Figures 8 and 9.

Other forms of the invention may be suggested by the disclosure herein which is to be understood as illustrative and not inclusive, and the exclusive use of those modifications which come within the scope of the appended claims is contemplated.

What is claimed is:

1. In a railway truss type brake beam having a compression member, a brake head seated thereon with an open ended pocket receiving the end of said compression member, a tension member extending through said brake head, and a tensioning device seated on the outer side of said brake head and engaging said tension member, said brake head including an integral rigid sleeve-like part in said pocket enclosing a portion of said tension member for a substantial distance spaced from said device, there being separately formed filler structure insertible endwise in said sleeve-like part and substantially surrounding said tension member to hold the latter against movement transversely of its length and relative to said head.

2. A brake beam as described in claim 1 in which the filler structure is deformable and yields to accommodate insertion of the tension member therethrough but resists undue play between the head and tension member when braking forces are applied and released through the beam.

3. A brake beam as described in claim 1 in which the filler structure is resilient to tightly engage the inner periphery of the sleeve-like part irrespective of variation between its diameter and the interior diameter of the brake head sleeve-like part.

4. A brake beam as described in claim 1 in which the filler structure comprises a liner seated in the brake head sleeve-like part, there being elements of said liner and part opposing each other lengthwise of the liner to hold the liner in place when the head is disassembled from the other beam parts.

5. A brake beam as described in claim 1 in which the filler structure comprises a bushing of resilient material held by its resiliency in assembled relation with the brake head sleeve-like part independently of the beam tension member.

6. A brake beam as described in claim 1 in which the filler structure comprises a rubber bushing lining the interior of the brake head sleeve-like part.

7. A brake beam as described in claim 1 in which the filler structure comprises a bushing of spring material possessing sufficient resiliency to hold it in assembled relation with the brake head sleeve-like part independently of the presence of the beam tension member.

8. A brake head for a railway truss type brake beam having a shoe mounting portion and a seat for a tension rod nut and having an integral sleeve directly behind said portion for surrounding a substantial portion of a tension rod at a point spaced from said seat, said sleeve being provided with a separately formed deformable bushing whereby a close fit may be provided between the head and a tension member extending therethrough.

9. A brake head for a railway truss type brake beam having a seat for a tension rod nut and having a transverse sleeve for surrounding a substantial portion of a tension rod at a point spaced from said seat, said sleeve being provided with a lining of rubber-like material of sufficient resiliency to hold the beam tension member in the sleeve against undue movement transversely of the sleeve during the application of braking forces.

10. A brake head for a railway truss type brake beam having a seat for a tension rod nut and having a transverse sleeve for surrounding a substantial portion of a tension rod at a point spaced from said seat, said sleeve being provided with a lining of material adapted to be deformed by the insertion of a tension member through the sleeve and to tightly surround the latter and thereby resist movement of the same transversely of the sleeve during the application of braking forces.

11. In a truss type brake beam, a compression member, a brake head mounted thereon and having an inner side wall and an outer side wall, a tension member extending through said head from side to side, a tensioning device on the end of said tension member, the outer wall of said head forming a seat for said device, a split cone inserted through the inner wall of said head and tightly embracing the adjacent portion of said tension member to hold the same against bending relative to said head.

12. In a truss type brake beam, a compression member, a brake head mounted thereon and having an inner side wall and an outer side wall, a tension member extending through said head from side to side, a tensioning device on the end of said tension member, the outer wall of said head forming a seat for said device, a split cone threaded into said inner wall and encircling the corresponding portion of said tension member and being rotatable to tighten its grip thereon to hold the end portion of said tension member against bending relative to said head.

EDWIN G. BUSSE.